(12) United States Patent
Chang et al.

(10) Patent No.: US 8,821,002 B2
(45) Date of Patent: Sep. 2, 2014

(54) LIGHT GUIDE PLATE AND BACKLIGHT MODULE

(75) Inventors: Kuangyao Chang, Shenzhen (CN); Kuojun Fang, Shenzhen (CN); Chechang Hu, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 351 days.

(21) Appl. No.: 13/375,338

(22) PCT Filed: Aug. 22, 2011

(86) PCT No.: PCT/CN2011/078680
§ 371 (c)(1),
(2), (4) Date: Nov. 30, 2011

(87) PCT Pub. No.: WO2013/010343
PCT Pub. Date: Jan. 24, 2013

(65) Prior Publication Data
US 2013/0021824 A1    Jan. 24, 2013

(30) Foreign Application Priority Data

Jul. 20, 2011    (CN) .......................... 2011 1 0203943

(51) Int. Cl.
*F21V 7/04*    (2006.01)
(52) U.S. Cl.
CPC ............ *G02B 6/0061* (2013.01); *G02B 6/0038* (2013.01)
USPC .......................................... 362/623; 362/625
(58) Field of Classification Search
CPC .. G02B 6/0031; G02B 6/0036; G02B 6/0038; G02B 6/0055; G02B 6/0058; G02B 6/0061; G02B 6/0065
USPC ................................... 362/623, 625, 626, 628
See application file for complete search history.

(56) References Cited

U.S. PATENT DOCUMENTS

| | | | | |
|---|---|---|---|---|
| 5,054,885 | A * | 10/1991 | Melby | 359/618 |
| 5,779,337 | A * | 7/1998 | Saito et al. | 362/619 |
| 7,156,548 | B2 * | 1/2007 | Teng et al. | 362/625 |
| 7,252,427 | B2 * | 8/2007 | Teng et al. | 362/626 |
| 7,278,772 | B2 | 10/2007 | Kunimochi | |
| 8,033,710 | B2 | 10/2011 | Omori et al. | |
| 2005/0237641 | A1 * | 10/2005 | Tang | 359/831 |
| 2008/0043488 | A1 | 2/2008 | Lee et al. | |
| 2010/0014318 | A1 * | 1/2010 | Chi et al. | 362/620 |
| 2010/0277951 | A1 | 11/2010 | Kim et al. | |
| 2011/0199697 | A1 | 8/2011 | Campbell et al. | |
| 2011/0299270 | A1 | 12/2011 | Kojima et al. | |

FOREIGN PATENT DOCUMENTS

| | | |
|---|---|---|
| CN | 2715173 | 8/2005 |
| CN | 200976054 | 11/2007 |
| CN | 101101407 | 1/2008 |

(Continued)

*Primary Examiner* — Julie Bannan
(74) *Attorney, Agent, or Firm* — Mark M. Friedman (57) ABSTRACT

The present invention provides a light guide plate and a backlight module. The backlight module comprises the light guide plate. The light guide plate comprises a plurality of elongated microstructures disposed on the light guide plate and parallel to a light-incident surface thereof. At least one curve parameter of profiles of the elongated microstructures is altered according to a position variation in an extending direction of the elongated microstructures, so as to adjust a brightness distribution in the extending direction of the elongated microstructures. The invention can improve a luminous efficiency of the light guide plate.

16 Claims, 8 Drawing Sheets

(56) References Cited

FOREIGN PATENT DOCUMENTS

| | | |
|---|---|---|
| CN | 201017056 | 2/2008 |
| CN | 101295047 | 10/2008 |
| CN | 101334500 A | 12/2008 |
| CN | 101398149 | 4/2009 |
| CN | 101427070 | 5/2009 |
| CN | 101482632 | 7/2009 |
| CN | 201307167 | 9/2009 |
| CN | 10176081 | 5/2010 |
| CN | 101726789 | 6/2010 |
| CN | 101981474 | 2/2011 |
| EP | 1602949 | 12/2005 |
| JP | 2007242336 | 9/2007 |
| WO | WO 2010098389 | 9/2010 |

* cited by examiner

LIGHT GUIDE PLATE AND BACKLIGHT MODULE

FIELD OF THE INVENTION

The present invention relates to a light guide plate and a backlight module, and more particularly to a light guide plate and a backlight module capable of raising luminous efficiency.

BACKGROUND OF THE INVENTION

At present, for a small and thin backlight module, light emitting diodes (LEDs) are often used for lighting, wherein a light guide plate is indispensable for the backlight module.

In normal, the light guide plate has scattering patterns or microstructures. In comparison with the scattering patterns, steps and a transport cost for processing the scattering patterns are omitted with the use of the microstructures, thereby saving manufacturing cost, as well as raising a production speed of devices.

Figure 1:
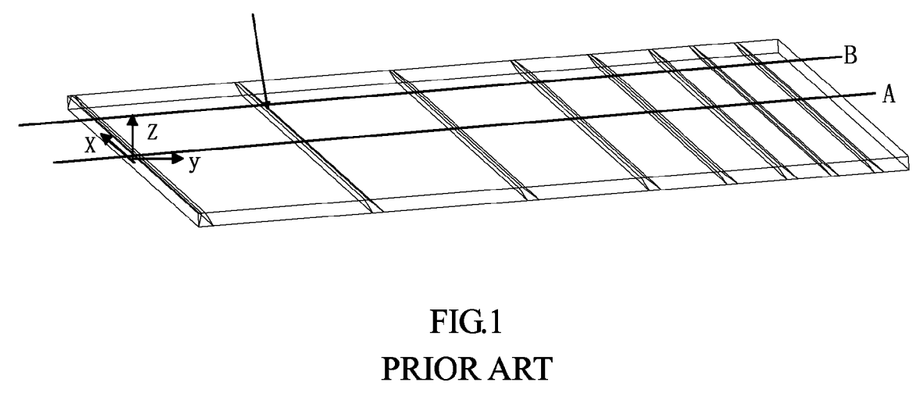
FIG. 1 is a structural diagram showing a conventional light guide plate.

However, the light guide plate with the microstructures has the defects described as follow. For visual effects, a desirable light guide plate has a higher brightness at a middle position thereof and a lower brightness at the fringe thereof. Referring to FIG. 1, a structural diagram showing a conventional light guide plate is illustrated. Regarding a light along a direction y, a distribution of the light along the direction y can be improved by adjusting an arrangement of the microstructures 111, so to adjust a uniformity of a panel brightness. Regarding a light along a direction x, the microstructures 111 are elongated microstructures with the same profile extending along the direction x, Thus, a distribution of the light along the direction x can not be improved by the microstructures 111, reducing a utilization rate of the light. Referring to FIG. 1 again, the brightness of the light along the direction y is detected at two positions A and B along the direction x, respectively. When an average brightness at the position A is defined as 100%, an average brightness at the position B is detected as 98%. In contrast, an average brightness at a side position of a light guide plate with the scattering patterns is detected as 92%. That is, in the direction x, the light guide plate can not concentrate the light on the middle position efficiently, and a portion of the light of a light source is distributed to both sides of the light guide plate. Accordingly, the brightness at the middle position can not be enhanced resulting in a loss of the light energy. In addition, the conventional light guide plate can not alter the light distribution thereof according to a user's requirements.

As a result, it is necessary to provide a light guide plate and a backlight module to solve the problems existing in the conventional technologies, as described above.

SUMMARY OF THE INVENTION

Regarding the conventional light guide plate and the backlight module using the same with a defect of low luminous efficiency, the present invention provides a light guide plate and a backlight module capable of altering at least one curve parameter of profiles of the elongated microstructures for adjusting a brightness distribution in the extending direction of the elongated microstructures, so as to arise the luminous efficiency thereof.

A primary object of the present invention is to provide a light guide plate, wherein the light guide plate comprises: a light-incident surface; and a plurality of elongated microstructures disposed on one side which is opposite to a light-emitting surface of the light guide plate, and parallel to the light-incident surface, and at least one curve parameter of profiles of the elongated microstructures is altered according to a position variation in an extending direction of the elongated microstructures, so as to adjust a brightness distribution in the extending direction of the elongated microstructures, and the at least one curve parameter of the profiles of the elongated microstructures is a curvature radius, an arc length, a tangential edge angle between a profile curve and the light guide plate, a base angle, a width or a height, and wherein the curve parameter of each of the microstructures is symmetrically varied in the extending direction, and the curve parameter of each of the microstructures is varied discontinuously or continuously.

Another object of the present invention is to provide a light guide plate, wherein the light guide plate comprises: a light-incident surface; and a plurality of elongated microstructures disposed on one side which is opposite to a light-emitting surface of the light guide plate, and parallel to the light-incident surface, and at least one curve parameter of profiles of the elongated microstructures is altered according to a position variation in an extending direction of the elongated microstructures, so as to adjust a brightness distribution in the extending direction of the elongated microstructures.

Still another object of the present invention is to provide a backlight module, wherein the backlight module comprises: a light source; a light guide plate backlight module comprising: a light-incident surface; and a plurality of elongated microstructures disposed on one side which is opposite to a light-emitting surface of the light guide plate, and parallel to the light-incident surface, wherein at least one curve parameter of profiles of the elongated microstructures is altered according to a position variation in an extending direction of the elongated microstructures, so as to adjust a brightness distribution in the extending direction of the elongated microstructures.

In one embodiment of the present invention, the at least one curve parameter of the profiles of the elongated microstructures is a curvature radius, an arc length, a tangential edge angle between a profile curve and the light guide plate, a base angle, a width or a height.

In one embodiment of the present invention, the curve parameter of each of the microstructures is symmetrically varied in the extending direction.

In one embodiment of the present invention, the profiles of the elongated microstructures are triangles with round corners.

In one embodiment of the present invention, when a curvature radius of the round corners of the profiles is altered according to the position variation in the extending direction of the elongated microstructures, the curvature radius of the round corners of the profiles at the middle position of the elongated microstructures is larger than the curvature radius of the round corners of the profiles at both sides of the elongated microstructures.

In one embodiment of the present invention, when a height of the profiles is altered according to the position variation in the extending direction of the elongated microstructures, the height of the profiles at the middle position of the elongated microstructures is lower than the height of the profiles at both sides of the elongated microstructures.

In one embodiment of the present invention, when an arc length of the round corners of the profiles is altered according to the position variation in the extending direction of the elongated microstructures, the arc length of the round corners of the profiles at the middle position of the elongated microstructures is larger than the arc length of the round corners of the profiles at both sides of the elongated microstructures.

In one embodiment of the present invention, when a curvature radius of the round corners and a height of the profiles are altered according to the position variation in the extending direction of the elongated microstructures, the curvature radius of the round corners of the profiles at the middle position of the elongated microstructures is larger than the curvature radius of the round corners of the profiles at both sides of the elongated microstructures, and the height of the profiles at the middle position of the elongated microstructures is lower than the height of the profiles at both sides of the elongated microstructures.

In one embodiment of the present invention, the profiles of the elongated microstructures are arcs.

In one embodiment of the present invention, when a curvature radius of the profiles is altered according to the position variation in the extending direction of the elongated microstructures, the curvature radius of the profiles at the middle position of the elongated microstructures is less than the curvature radius of the profiles at both sides of the elongated microstructures.

In one embodiment of the present invention, when an arc length of the profiles is altered according to the position variation in the extending direction of the elongated microstructures, the arc length of the profiles at the middle position of the elongated microstructures is larger than the arc length of the profiles at both sides of the elongated microstructures.

In one embodiment of the present invention, when a height of the profiles is altered according to the position variation in the extending direction of the elongated microstructures, the height of the profiles at the middle position of the elongated microstructures is higher than the height of the profiles at both sides of the elongated microstructures.

In one embodiment of the present invention, the profiles of the elongated microstructures are triangles.

In one embodiment of the present invention, when a height of the profiles is altered according to the position variation in the extending direction of the elongated microstructures, the height of the profiles at the middle position of the elongated microstructures is higher than the height of the profiles at both sides of the elongated microstructures.

In one embodiment of the present invention, when a width of the profiles is altered according to the position variation in the extending direction of the elongated microstructures, the width of the profiles at the middle position of the elongated microstructures is larger than the width of the profiles at both sides of the elongated microstructures.

In one embodiment of the present invention, the elongated microstructures are disposed on the light-emitting surface and the side opposite to the light-emitting surface, or on the light-emitting surface of the light guide plate.

In one embodiment of the present invention, the curve parameter of each of the microstructures is varied discontinuously or continuously.

In comparison with the conventional light guide plate having the problem of low luminous efficiency, the curve parameter of the elongated microstructures of the light guide plate and the backlight module of the present invention is adjustable, so as to adjust the brightness distribution in the extending direction of the elongated microstructures. In that manner, the light-emitting surface of the light guide plate can have a higher brightness at the middle position and a lower brightness at the fringe along the direction x. Alternatively, the light-emitting surface of the light guide plate can have a lower brightness at the middle position and a higher brightness at the fringe along the direction x. Alternatively, the light-emitting surface of the light guide plate can have a higher brightness at a specific region.

The structure and the technical means adopted by the present invention to achieve the above and other objects can be best understood by referring to the following detailed description of the preferred embodiments and the accompanying drawings:

DETAILED DESCRIPTION OF THE PREFERRED EMBODIMENTS

The following embodiments are exemplified by referring to the accompanying drawings, for describing specific embodiments implemented by the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

In the drawings, like reference numerals indicate like components or items.

Figure 2A:
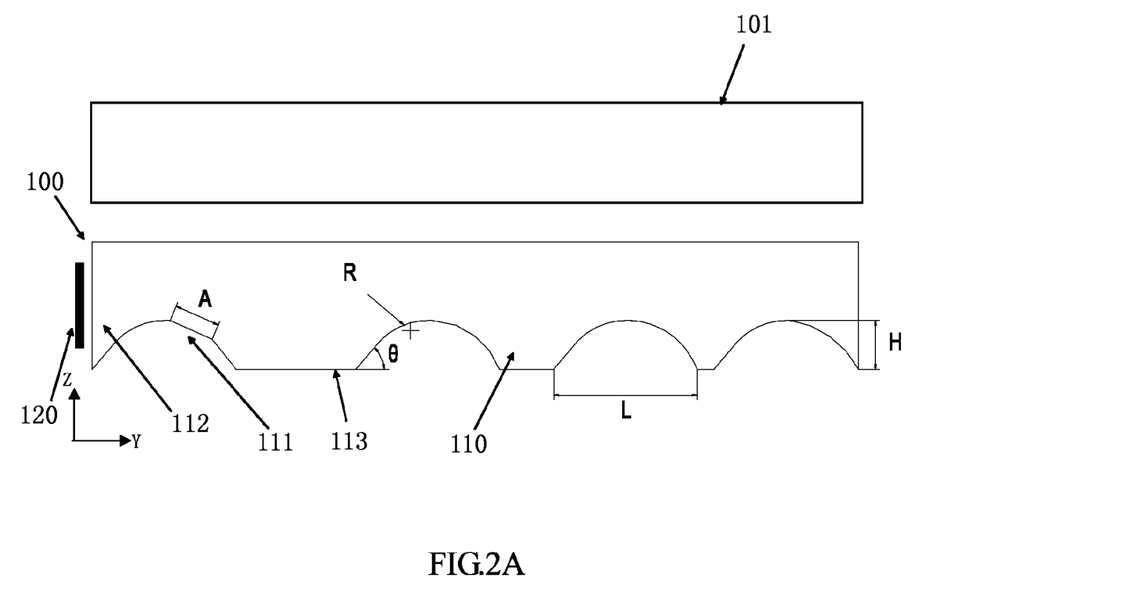
FIG. 2A is a schematic diagram showing elongated microstructures of a light guide plate with curve parameters according to a preferred embodiment of the present invention.
Figure 2B:
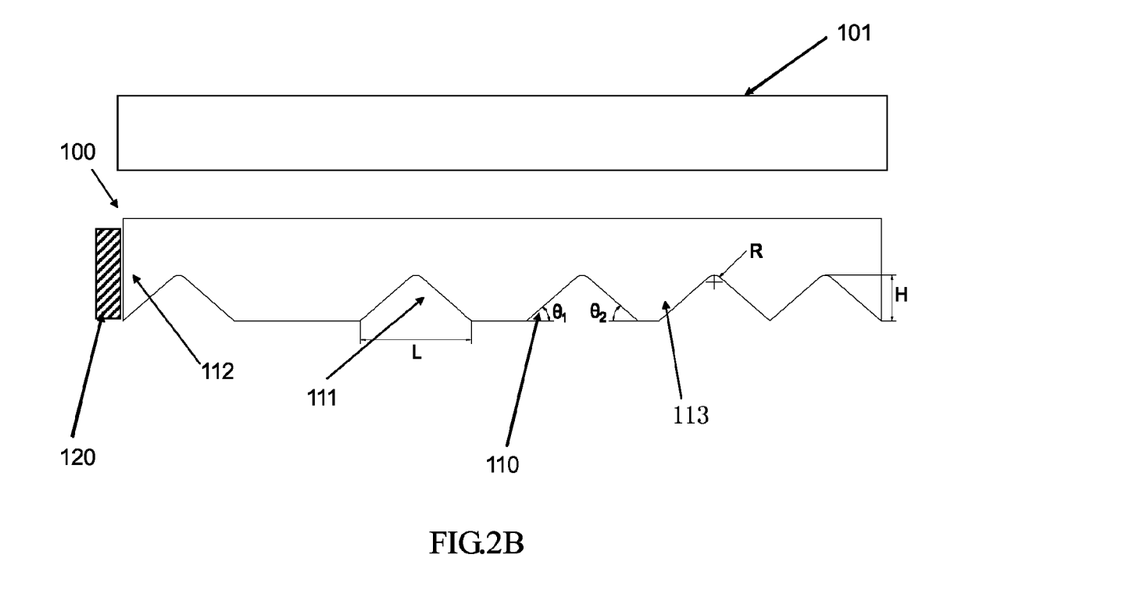
FIG. 2B is a schematic diagram showing elongated microstructures of a light guide plate with curve parameters according to another preferred embodiment of the present invention.

Referring to FIG. 2A and FIG. 2B, schematic diagrams showing a light guide plate comprising a plurality of elongated microstructures according to a preferred embodiment of the present invention are illustrated. A backlight module 100 is shown in the diagrams. The backlight module 100 may be a side-light type backlight module and disposed opposite to a display panel 101 (such as a liquid crystal display panel), thereby forming a display apparatus (such as an LCD apparatus). The backlight module 100 comprises the light guide plate 110 and a light source 120. The light source 120 are, for example, a cold cathode fluorescent lamp (CCFL), a light emitting diode (LED), an organic light emitting diode (OLED), an electro-luminescence (EL) device, a light bar or any combination thereof. The light guide plate 110 comprises a light-incident surface 112 and a bottom surface 113 (one side opposite to the light-emitting surface). The light-incident surface 112 faces to the light source 120 for allowing the light emitted by the light source 120 to be inputted into the light guide plate 110. The bottom surface 113 is adjacent to the light-incident surface 112. The plurality of elongated microstructures 111 are disposed on the bottom surface 113. The elongated microstructures 111 extend along a direction parallel to the light-incident surface 112. In this case, profiles of the elongated microstructures 111 may be in the shape of an arc (referring to FIG. 2A), a rhomboid (referring to FIG. 2B) or other regular shapes.

In the preferred embodiment of the light guide plate of the present invention, the light guide plate 110 comprises the elongated microstructures 111 which are disposed thereon and parallel to the light-incident surface of the light guide plate. At least one curve parameter of the profiles of the elongated microstructures 111 is altered according to a position variation in an extending direction of the elongated microstructures 111, thereby allowing to adjust a brightness distribution in the extending direction of the elongated microstructures 111. In the conventional light guide plate shown in FIG. 1, arrangement intervals between the elongated microstructures 111 are inconsistent in a direction y. Normally, farther away the light-incident surface a position is, less light are allowed to be emitted thereto, and more elongated microstructures 111 are required for reflecting light and raising the brightness. Thus, for adjusting the brightness distribution in the direction y, farther away the light-incident surface the elongated microstructures 111 are, denser an arrangement of the elongated microstructures 111 is. However, the brightness distribution in a direction x of the conventional light guide plate is not adjustable. In comparison with the conventional light guide plate, the curve parameter of the profile of each of the elongated microstructures 111 of the present invention is altered according to a position variation in an extending direction (i.e. the direction x) of the elongated microstructures 111, so as to allow the luminous intensity of the reflected light in the extending direction of each of the elongated microstructures 111 to be different, thereby adjusting the brightness distribution in a direction x. With the use of this adjustment of the elongated microstructures of the present invention, a uniform light-emitting can be achieved. Alternatively, with the use of this adjustment, the light guide plate can have a higher brightness at a middle position thereof and a lower brightness at the fringe thereof. Alternatively, with the use of this adjustment, the light guide plate can have a lower brightness at a middle position thereof and a higher brightness at the fringe thereof. Alternatively, with the use of this adjustment, the brightness of a specific region thereof can be higher. The arrangement intervals between the elongated microstructures of the present invention can be consistent, or less when being far away the light-incident surface.

In the preferred embodiment of the light guide plate of the present invention, the at least one curve parameter of the profiles of the elongated microstructures 111 may be a curvature radius, an arc length, a tangential edge angle between a profile curve and the light guide plate, a base angle, a width or a height. In this invention, the elongated microstructures 111 can be improved by altering only one curve parameter of the elongated microstructures 111, such as curvature radius or width. Alternatively, the elongated microstructures 111 can be improved by altering more curve parameters, such as tangential edge angle and curvature radius. When the curve parameter of the profiles is different, a shape of the profiles is different, and the light extraction is also different, so as to adjust the brightness distribution in the direction x. Referring to FIG. 2A and FIG. 2B, schematic diagrams showing the curve parameter of the elongated microstructures 111 are illustrated. In this case, A indicates the arc length of the profiles, and R indicates the curvature radius, and θ indicates the tangential edge angle between the profile curve and the light guide plate, and θ1 and θ2 indicate the base angles of the profiles, and L indicates the width of the profiles, and H indicates the height of the profiles. Certainly, other curve parameters can be used for altering the shape of the profiles. For example, when a curvature of the profiles is altered, the shape of the profiles is also altered. The adjustment of the elongated microstructures 111 can be achieved by altering only one curve parameter or more parameters. A user can choose a suitable adjustment according to a real situation. The adjustment of the brightness distribution in the extending direction of the elongated microstructures 111 can be achieved by any variation of the shape of the profiles of the elongated microstructures 111 without departing from the scope and the spirit of the invention.

In the preferred embodiment of the light guide plate of the present invention, the curve parameter of each of the microstructures is symmetrically varied in the extending direction. That is, the curve parameter of each of the microstructures is symmetrically varied from the middle position in the direction x. The bilateral variation of the curve parameter from the middle position in the direction x may be progressively increasing, progressively decreasing or complicated variation. Since the variation of the curve parameter is bilateral from the middle position, the shape of the elongated microstructures 111 can be more regular for controlling the brightness distribution in the direction x, hence achieving an optimum brightness distribution, as well as raising a utilization rate of the light. In addition, the bilateral elongated microstructures 111 are easy for processing.

In the preferred embodiment of the present invention, the elongated microstructures 111 can be disposed on the side (the bottom surface) opposite to the light-emitting surface, and/or on the light-emitting surface of the light guide plate. The elongated microstructures 111 of the present invention are configured to adjust the brightness distribution in the direction x, and the elongated microstructures 111 may be disposed on the light-emitting surface or the side opposite to the light-emitting surface of the light guide plate, or on the light-emitting surface and the side opposite to the light-emitting surface of the light guide plate at the same time. A user can choose a suitable method for processing the light guide plate, so as to form the elongated microstructures 111.

Figure 3:
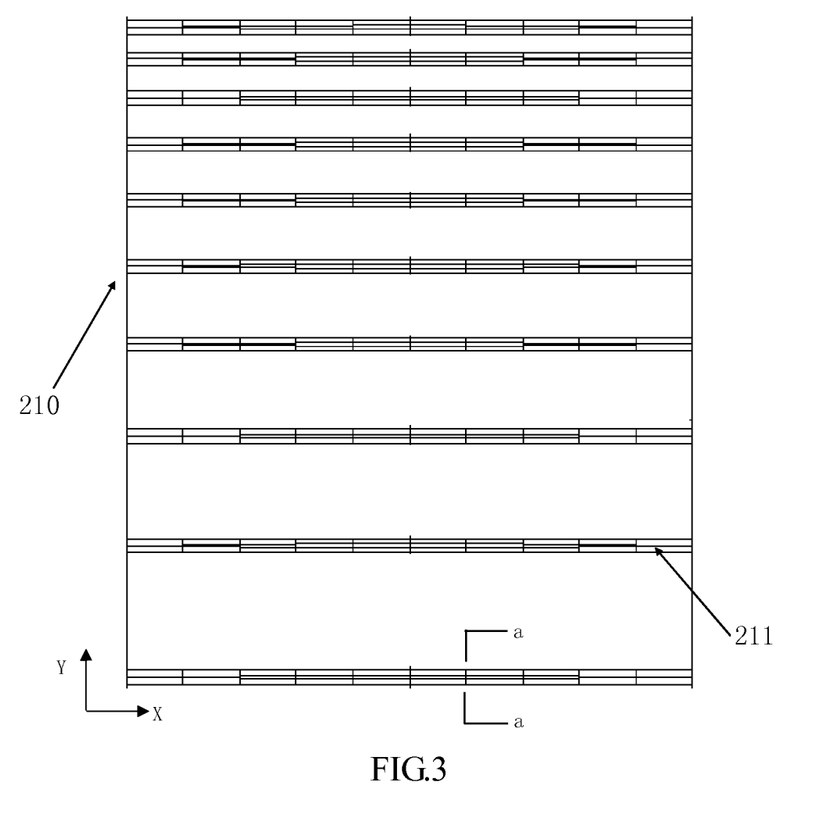
FIG. 3 is a top view showing a light guide plate according to a first preferred embodiment of the present invention.

Referring to FIG. 3, a top view showing a light guide plate according to a first embodiment of the present invention is illustrated.

Figure 4:
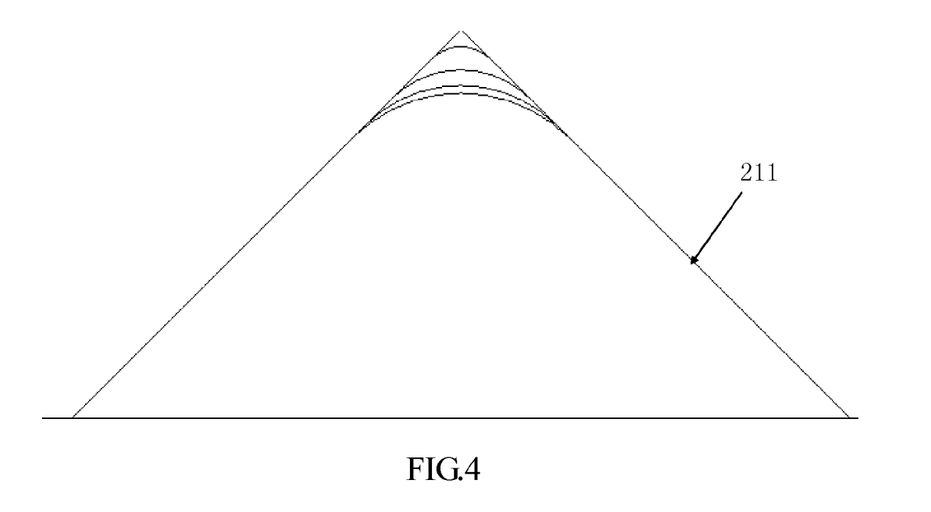
FIG. 4 is a cross-sectional view along the cross-sectional line a-a shown in FIG. 3.
Figure 5:
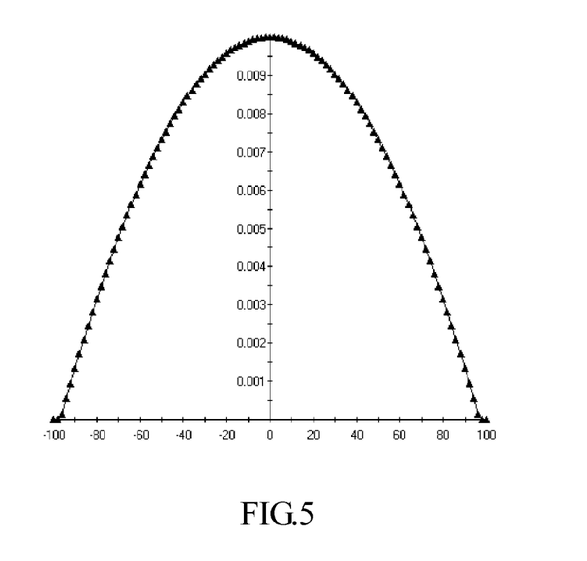
FIG. 5 is a schematic diagram showing a curvature radius distribution of the elongated microstructures of the light guide plate according to the first embodiment of the present invention.

In this embodiment, the profiles of the elongated microstructures 211 of the light guide plate 210 may be triangles with round corners. A curvature radius of the round corners of the profiles is altered according to the position variation in the extending direction of the elongated microstructures 211. As shown in FIG. 3, the curvature radius of the round corners of the profiles of the elongated microstructures 211 is symmetrically varied. The curvature radius (not the curvature, curvature=1/curvature radius) of the round corners of the profiles is larger at the middle position of the elongated microstructures 211, and the curvature radius of the round corners of the profiles is less at both sides of the elongated microstructures 211, so as to make the light to be outputted from the middle position of the elongated microstructures 211 more easily, for adjusting the brightness distribution in the direction x. FIG. 4 is a cross-sectional diagram showing the elongated microstructures 211 of the light guide plate according to the first embodiment of the present invention. As shown in FIG. 4, the curvature radius of the round corners of the profiles of the elongated microstructures 211 is altered, and thus a height of the profiles of the elongated microstructures 211 is also altered according to the position variation in the extending direction of the elongated microstructures 211. In this case, the height of the profiles is lower at the middle position of the elongated microstructures 211, and the height of the profiles is higher at the both sides of the elongated microstructures 211. An arc length of the round corners of the profiles of the elongated microstructures 211 is also altered. In this case, the arc length of the profiles is larger at the middle position of the elongated microstructures 211, and the arc length of the profiles is less at the both sides of the elongated microstructures 211. FIG. 5 is a schematic diagram showing a curvature radius distribution of the elongated microstructures 211 of the light guide plate according to the first embodiment of the present invention. As shown in FIG. 5, a relationship between the curvature radius of the profiles of the elongated microstructures 211 and the position in extending direction thereof is illustrated, and the curvature radius of the profiles is larger at the middle position of the elongated microstructures 211, and the curvature radius of the profiles is less at the both sides of the elongated microstructures 211. According to the brightness requirement of different regions, a variation of the curvature radius of the elongated microstructures of the light guide plate of the present embodiment may be that the curvature radius of the profiles is larger at the middle position of the elongated microstructures 211, and the curvature radius of the profiles is less at the both sides of the elongated microstructures 211. The curve parameter of each of the microstructures 211 of the present invention may be varied discontinuously or continuously.

Figure 6:
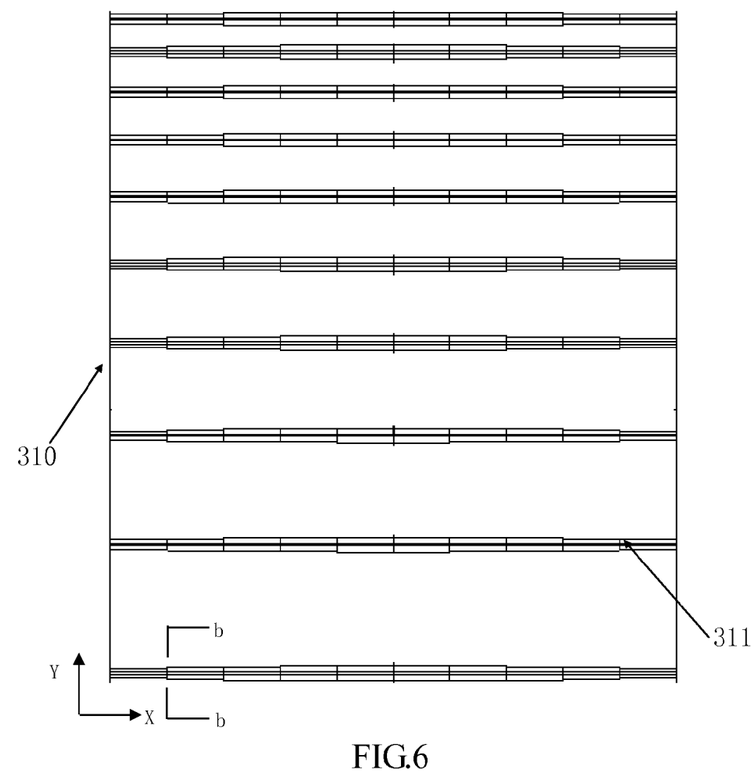
FIG. 6 is a top view showing a light guide plate according to a second preferred embodiment of the present invention.

Referring to FIG. 6, a top view showing a light guide plate according to a second embodiment of the present invention is illustrated.

Figure 7:
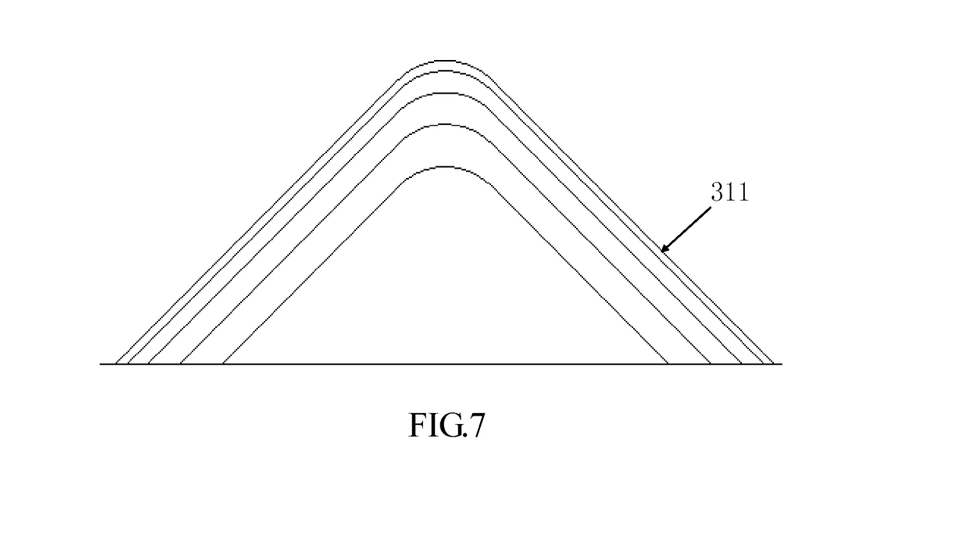
FIG. 7 is a cross-sectional view along the cross-sectional line b-b shown in FIG. 6.
Figure 8:
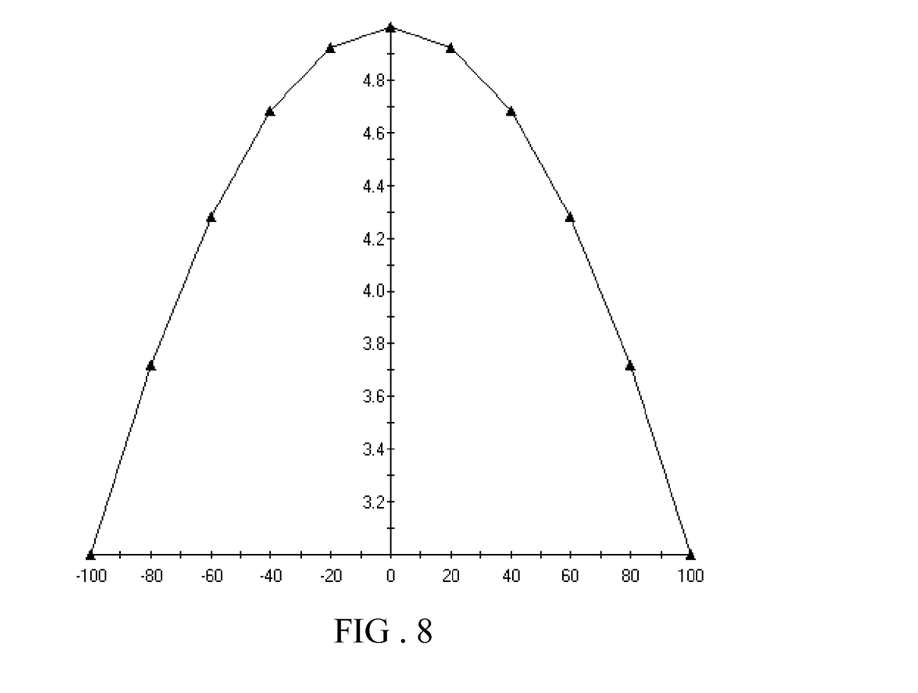
FIG. 8 is a schematic diagram showing a width distribution of the elongated microstructures of the light guide plate according to the second embodiment of the present invention.

In this embodiment, the profiles of the elongated microstructures 311 of the light guide plate 310 may be triangles. A width of the profiles of the elongated microstructures 311 is altered according to the position variation in the extending direction of the elongated microstructures 311. As shown in FIG. 6, the width of the profiles of the elongated microstructures 311 is symmetrically varied. The width of the profiles is larger at the middle position of the elongated microstructures 311, and the width of the profiles is less at both sides of the elongated microstructures 311, so as to allow the elongated microstructures 311 to reflect more light, for adjusting the brightness distribution (a higher brightness at the middle position, a lower brightness at the both sides) in the direction x. FIG. 7 is a cross-sectional diagram showing the elongated microstructures 311 of the light guide plate according to the third embodiment of the present invention. As shown in FIG. 7, the width of the profiles of the elongated microstructures 311 is altered, and thus a height of the profiles of the elongated microstructures 311 is also altered according to the position variation in the extending direction of the elongated microstructures 311. In this case, the height of the profiles is higher at the middle position of the elongated microstructures 311, and the height of the profiles is lower at the both sides of the elongated microstructures 311. FIG. 8 is a schematic diagram showing a width distribution of the elongated microstructures 311 of the light guide plate according to the second embodiment of the present invention. As shown in FIG. 8, a relationship between the width of the profiles of the elongated microstructures 311 and the position in extending direction thereof is illustrated, and the width of the profiles is larger at the middle position of the elongated microstructures 311, and the curvature radius of the profiles is less at the both sides of the elongated microstructures 311. According to the brightness requirement of different regions, a variation of the width of the elongated microstructures of the light guide plate of the present embodiment may be that the profiles of the elongated microstructures 311 have a lower height and a narrower width at the middle position, and the profiles of the elongated microstructures 311 have a higher height and a wider width at both sides. The curve parameter of each of the microstructures 311 of the present invention may be varied discontinuously or continuously.

Figure 9:
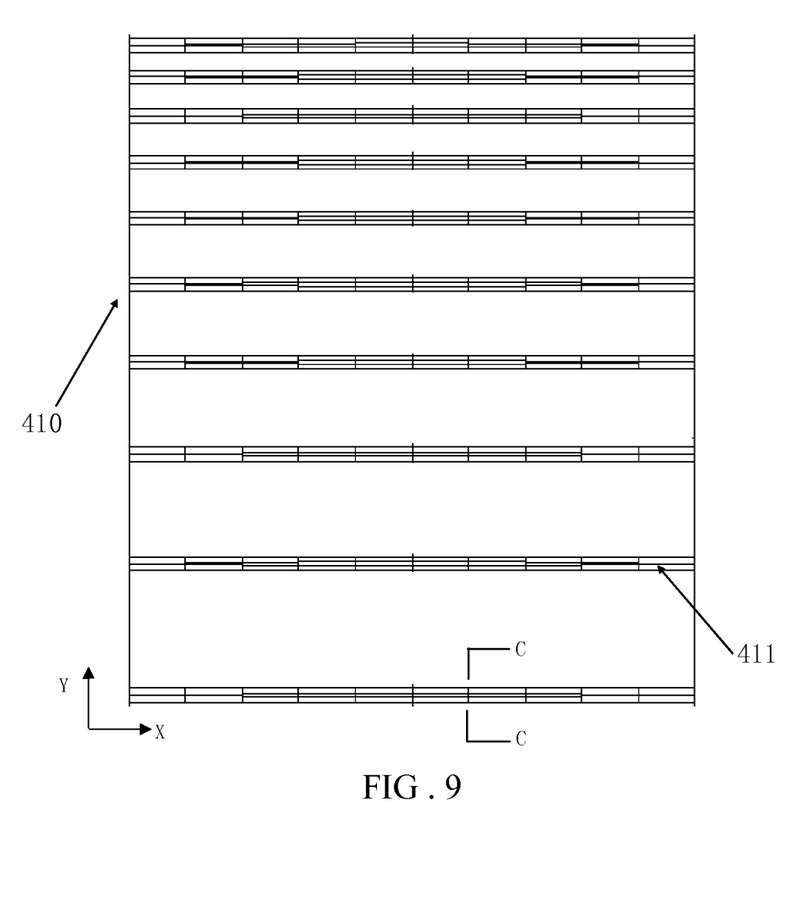
FIG. 9 is a top view showing a light guide plate according to a third preferred embodiment of the present invention.

Referring to FIG. 9, a top view showing a light guide plate according to a third embodiment of the present invention is illustrated.

Figure 10:
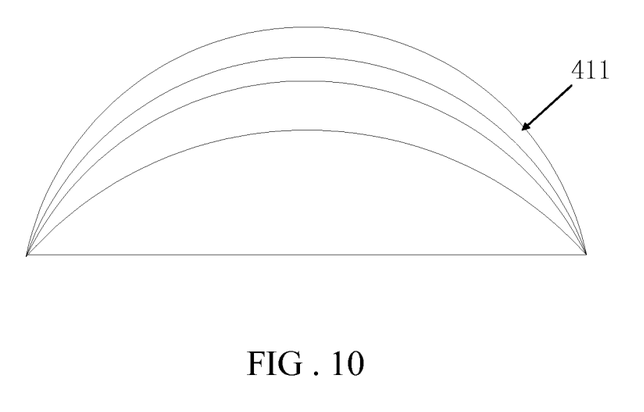
FIG. 10 is a cross-sectional view along the cross-sectional line c-c shown in FIG. 9.

In this embodiment, the profiles of the elongated microstructures 411 of the light guide plate 410 may be arcs. A curvature radius of the profiles is altered according to the position variation in the extending direction of the elongated microstructures 411. As shown in FIG. 9, the curvature radius of the profiles of the elongated microstructures 411 is symmetrically varied. The curvature radius of the profiles is less at the middle position of the elongated microstructures 411, and the curvature radius of the profiles is larger at both sides of the elongated microstructures 411, so as to make the light to be outputted from the middle position of the elongated microstructures 411 more easily, for adjusting the brightness distribution in the direction x. FIG. 10 is a cross-sectional diagram showing the elongated microstructures 411 of the light guide plate according to the third embodiment of the present invention. As shown in FIG. 10, the curvature radius of the profiles of the elongated microstructures 411 is altered, and thus a height of the profiles of the elongated microstructures 411 is also altered according to the position variation in the extending direction of the elongated microstructures 211. In this case, the height of the profiles is higher at the middle position of the elongated microstructures 411, and the height of the profiles is lower at the both sides of the elongated microstructures 411. An arc length of the profiles of the elongated microstructures 411 is also altered according to the position variation in the extending direction of the elongated microstructures 411. In this case, the arc length of the profiles is larger at the middle position of the elongated microstructures 411, and the arc length of the profiles is less at the both sides of the elongated microstructures 411. According to the brightness requirement of different regions, a variation of the curvature radius of the elongated microstructures of the light guide plate of the present embodiment may be that the curvature radius of the profiles is less at the middle position of the elongated microstructures 411, and the curvature radius of the profiles is larger at the both sides of the elongated microstructures 411. The curve parameter of each of the microstructures 411 of the present invention may be varied discontinuously or continuously.

The present invention further relates to a backlight module comprising the light guide plate. The light guide plate comprises the elongated microstructures which are disposed on the light guide plate, and parallel to the light-incident surface, wherein the curve parameter of the profiles of the elongated microstructures is altered according to the position variation in the extending direction of the elongated microstructures, so as to adjust the brightness distribution in the extending direction of the elongated microstructures. The curve parameter of the profiles of the elongated microstructures may be a curvature radius, an arc length, a tangential edge angle between a profile curve and the light guide plate, a base angle, a width or a height. The curve parameter of each of the microstructures is symmetrically varied in the extending direction. Referring to the embodiments of the light guide plate, the embodiments and beneficial effects of the backlight module of the present invention are described therein.

As described above, the curve parameter of the elongated microstructures of the light guide plate and the backlight module of the present invention is adjustable, so as to adjust the brightness distribution in the extending direction of the elongated microstructures. In that manner, the light-emitting surface of the light guide plate can have a higher brightness at the middle position and a lower brightness at the fringe along the direction x, thereby arising a luminous efficiency.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A light guide plate, characterized in that: the light guide plate comprises:
   a light-incident surface; and
   a plurality of elongated microstructures disposed on one side which is opposite to a light-emitting surface of the light guide plate, and parallel to the light-incident surface, wherein at least one curve parameter of profiles of the elongated microstructures is altered according to a position variation in an extending direction of the elongated microstructures, so as to adjust a brightness distribution in the extending direction of the elongated microstructures;
   wherein the at least one curve parameter of the profiles of the elongated microstructures is a curvature radius, an arc length, a tangential edge angle between a profile curve and the light guide plate, a base angle, a width or a height;
   wherein the curve parameter of each of the microstructures is symmetrically varied in the extending direction;
   wherein the curve parameter of each of the microstructures is varied discontinuously or continuously;
   wherein the profiles of the elongated microstructures are arcs, and when a curvature radius of the profiles is altered according to the position variation in the extending direction of the elongated microstructures, the curvature radius of the profiles at the middle position of the elongated microstructures is less than the curvature radius of the profiles at both sides of the elongated microstructures.

2. A light guide plate, characterized in that: the light guide plate comprises:
   a light-incident surface; and
   a plurality of elongated microstructures disposed on one side which is opposite to a light-emitting surface of the light guide plate, and parallel to the light-incident surface, wherein at least one curve parameter of profiles of the elongated microstructures is altered according to a position variation in an extending direction of the elongated microstructures, so as to adjust a brightness distribution in the extending direction of the elongated microstructures;
   wherein the at least one curve parameter of the profiles of the elongated microstructures is a curvature radius, an arc length, a tangential edge angle between a profile curve and the light guide plate, a base angle, a width or a height;
   wherein the profiles of the elongated microstructures are arcs, and when a curvature radius of the profiles is altered according to the position variation in the extending direction of the elongated microstructures, the curvature radius of the profiles at the middle position of the elongated microstructures is less than the curvature radius of the profiles at both sides of the elongated microstructures.

3. The light guide plate according to claim 2, characterized in that:
   the curve parameter of each of the microstructures is symmetrically varied in the extending direction.

4. The light guide plate according to claim 2, characterized in that: the profiles of the elongated microstructures are triangles with round corners.

5. The light guide plate according to claim 4, characterized in that: when a curvature radius of the round corners of the profiles is altered according to the position variation in the extending direction of the elongated microstructures, the curvature radius of the round corners of the profiles at the middle position of the elongated microstructures is larger than the curvature radius of the round corners of the profiles at both sides of the elongated microstructures.

6. The light guide plate according to claim 4, characterized in that: when a height of the profiles is altered according to the position variation in the extending direction of the elongated microstructures, the height of the profiles at the middle position of the elongated microstructures is lower than the height of the profiles at both sides of the elongated microstructures.

7. The light guide plate according to claim 4, characterized in that: when an arc length of the round corners of the profiles is altered according to the position variation in the extending direction of the elongated microstructures, the arc length of the round corners of the profiles at the middle position of the elongated microstructures is larger than the arc length of the round corners of the profiles at both sides of the elongated microstructures.

8. The light guide plate according to claim 4, characterized in that: when a curvature radius of the round corners and a height of the profiles are altered according to the position variation in the extending direction of the elongated microstructures, the curvature radius of the round corners of the profiles at the middle position of the elongated microstructures is larger than the curvature radius of the round corners of the profiles at both sides of the elongated microstructures, and the height of the profiles at the middle position of the elongated microstructures is lower than the height of the profiles at both sides of the elongated microstructures.

9. The light guide plate according to claim 2, characterized in that: the profiles of the elongated microstructures are triangles.

10. The light guide plate according to claim 9, characterized in that: when a height of the profiles is altered according to the position variation in the extending direction of the elongated microstructures, the height of the profiles at the middle position of the elongated microstructures is higher than the height of the profiles at both sides of the elongated microstructures.

11. The light guide plate according to claim 9, characterized in that: when a width of the profiles is altered according to the position variation in the extending direction of the elongated microstructures, the width of the profiles at the middle position of the elongated microstructures is larger than the width of the profiles at both sides of the elongated microstructures.

12. A light guide plate, characterized in that: the light guide plate comprises:
   a light-incident surface; and
   a plurality of elongated microstructures disposed on one side which is opposite to a light-emitting surface of the light guide plate, and parallel to the light-incident surface, wherein at least one curve parameter of profiles of the elongated microstructures is altered according to a position variation in an extending direction of the elongated microstructures, so as to adjust a brightness distribution in the extending direction of the elongated microstructures;

wherein the at least one curve parameter of the profiles of the elongated microstructures is a curvature radius, an arc length, a tangential edge angle between a profile curve and the light guide plate, a base angle, a width or a height;

wherein the profiles of the elongated microstructures are arcs, and when an arc length of the profiles is altered according to the position variation in the extending direction of the elongated microstructures, the arc length of the profiles at the middle position of the elongated microstructures is larger than the arc length of the profiles at both sides of the elongated microstructures.

13. A light guide plate, characterized in that: the light guide plate comprises:

a light-incident surface; and a plurality of elongated microstructures disposed on one side which is opposite to a light-emitting surface of the light guide plate, and parallel to the light-incident surface, wherein at least one curve parameter of profiles of the elongated microstructures is altered according to a position variation in an extending direction of the elongated microstructures, so as to adjust a brightness distribution in the extending direction of the elongated microstructures;

wherein the at least one curve parameter of the profiles of the elongated microstructures is a curvature radius, an arc length, a tangential edge angle between a profile curve and the light guide plate, a base angle, a width or a height;

wherein the profiles of the elongated microstructures are arcs, and when a height of the profiles is altered according to the position variation in the extending direction of the elongated microstructures, the height of the profiles at the middle position of the elongated microstructures is higher than the height of the profiles at both sides of the elongated microstructures.

14. The light guide plate according to claim 2, characterized in that: the elongated microstructures are disposed on the light-emitting surface and the side opposite to the light-emitting surface.

15. The light guide plate according to claim 2, characterized in that: the curve parameter of each of the microstructures is varied discontinuously or continuously.

16. A backlight module, characterized in that: the backlight module comprises:

a light source; and a light guide plate backlight module comprising:

a light-incident surface; and a plurality of elongated microstructures disposed on one side which is opposite to a light-emitting surface of the light guide plate, and parallel to the light-incident surface, wherein at least one curve parameter of profiles of the elongated microstructures is altered according to a position variation in an extending direction of the elongated microstructures, so as to adjust a brightness distribution in the extending direction of the elongated microstructures;

wherein the at least one curve parameter of the profiles of the elongated microstructures is a curvature radius, an arc length, a tangential edge angle between a profile curve and the light guide plate, a base angle, a width or a height;

wherein the profiles of the elongated microstructures are arcs, and when a curvature radius of the profiles is altered according to the position variation in the extending direction of the elongated microstructures, the curvature radius of the profiles at the middle position of the elongated microstructures is less than the curvature radius of the profiles at both sides of the elongated microstructures.

\* \* \* \* \*